Figure 1:
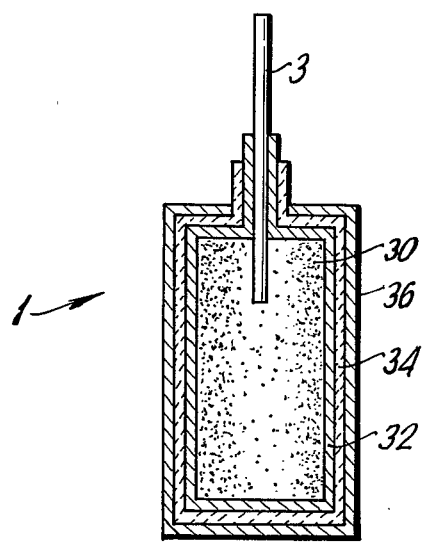

United States Patent [19]

Lambrecht

[11] 4,070,747
[45] Jan. 31, 1978

[54] ANODE AND CATHODE LEAD WIRE ASSEMBLY FOR SOLID ELECTROLYTIC CAPACITORS

[75] Inventor: Richard Arthur Lambrecht, Greenville, S.C.

[73] Assignee: Union Carbide Corporation, New York, N.Y.

[21] Appl. No.: 753,566

[22] Filed: Dec. 22, 1976

[51] Int. Cl.² .............................................. B01J 17/00
[52] U.S. Cl. ..................................................... 29/570
[58] Field of Search ......................... 29/570, 589, 591; 361/433

[56] References Cited

U.S. PATENT DOCUMENTS 3,611,054  10/1971  Piper et al. .............................. 29/570

Primary Examiner—Gerald A. Dost
Attorney, Agent, or Firm—Frederick J. McCarthy, Jr.

[57] ABSTRACT

A lead wire assembly is provided which permits soldering connections and welding connections to be made to the anode and cathode of a solid electrolytic capacitor body while applying force in a single direction to the lead wire assembly during soldering and welding. Automatic processing of a multiplicity of capacitor bodies is facilitated by the present invention.

1 Claim, 10 Drawing Figures

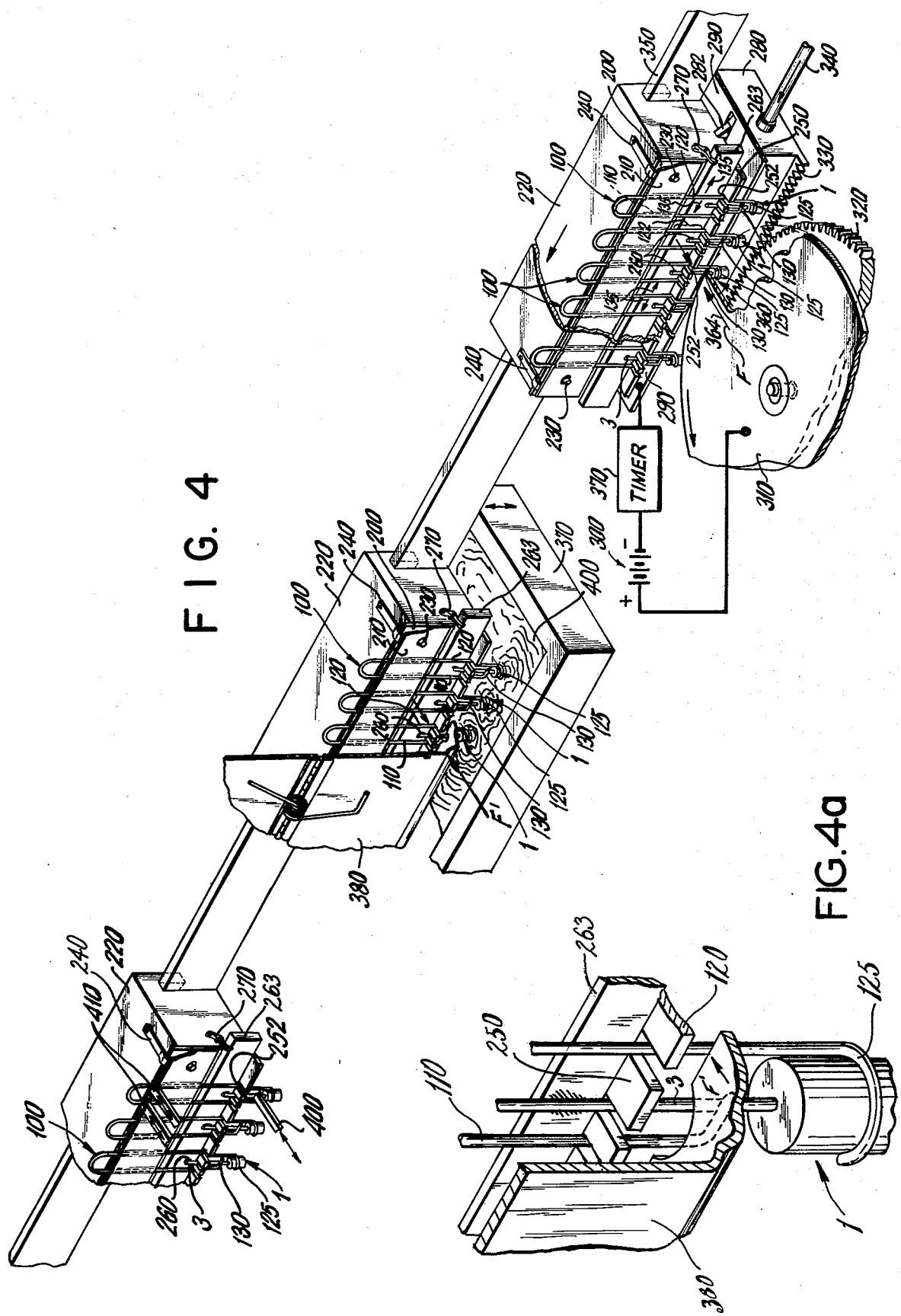

ANODE AND CATHODE LEAD WIRE ASSEMBLY FOR SOLID ELECTROLYTIC CAPACITORS

The present invention is directed to a lead wire assembly for solid electrolytic capacitors. More particularly, the present invention is directed to the attachment of cathode and anode lead wires to a solid electrolytic capacitor body.

Solid electrolytic capacitors, as is well known in the art, commonly comprise a generally cylindrical capacitor body having an outer cathode layer surrounding an anode of film forming metal, e.g., tantalum.

The anode is formed with an axially extending lead out rod or wire, to which an anode lead wire is subsequently attached, e.g., by welding, while a cathode lead wire is subsequently attached, e.g., by soldering, to the cathode layer.

A common prior art practice for connecting cathode and anode lead wires to capacitor bodies has involved the use of lead wire assemblies comprising a pre-formed wire shape, such shape having a pair of parallel wire portions, one of which is bent transversely to abut the anode lead out rod of the capacitor, while the other is shaped to longitudinally abut the cathode layer of the capacitor body. During welding of the anode lead out rod to the transverse portion noted above force must be applied thereto in an appropriate direction to maintain contact during welding, while during soldering of the longitudinal portion to the cathode layer, a holding force is required at a direction 90° from the welding holding force. This leads to the requirement for complex and expensive equipment and renders difficult the proper connection to the cathode layer of the capacitor body, particularly when the diameters of capacitor bodies vary as is common in commercial production It is accordingly an object of the present invention to provide a simple and inexpensive lead wire assembly method and device for solid electrolytic capacitors.

Figure 2:
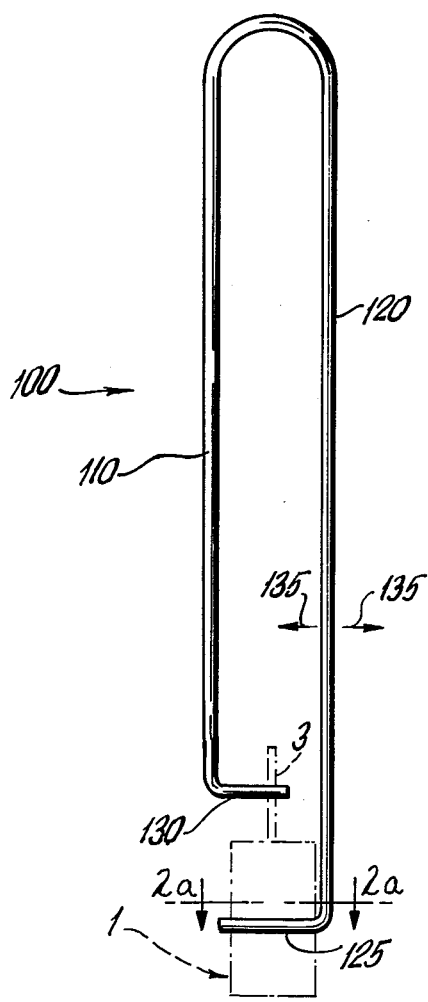
Figure 2A:
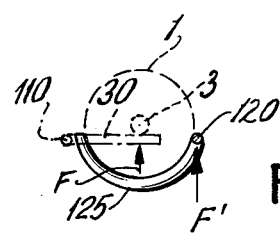

Other objects will be apparent from the following description and claims taken in conjunction with the drawings wherein FIG. 1 shows a sectional elevation view of a conventional solid electrolytic capacitor body FIG. 2 shows a lead wire assembly in accordance with the present invention FIG. 2(a) shows a cross-section of the device of FIG. 2

Figure 2B:
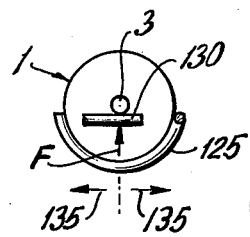
Figure 2C:
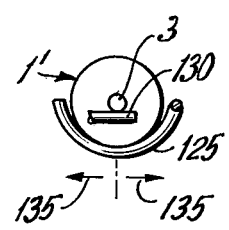
Figure 2D:
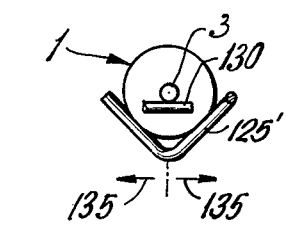
Figure 2E:
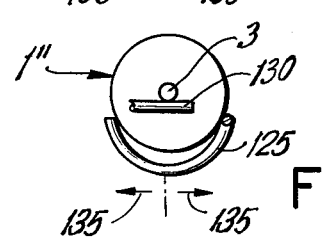
Figure 3:
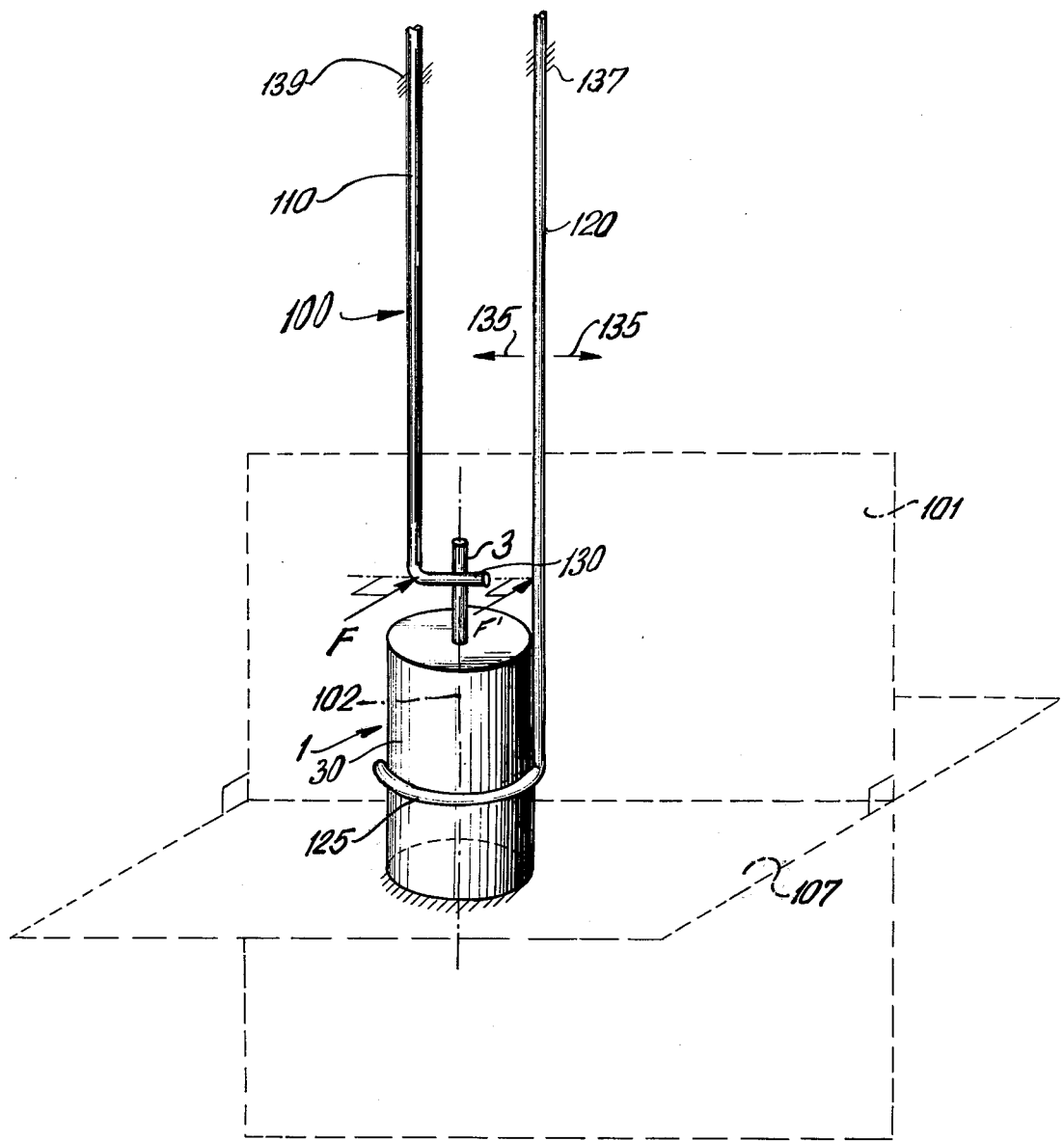

FIGS. 2(b) to 2(e) show cross-sections of a device in accordance with the present invention with capacitor bodies of different diameters FIG. 3 is a further view in isometric of the device of FIG. 2 and FIG. 4, and the partial view of FIG. 4(a) illustrate a particular embodiment of the method of the present invention.

With reference to the drawing FIG. 1 shows a cylindrical capacitor body 1 comprising a generally cylindrical sintered tantalum anode body 30 having an anode lead out rod 3 electrically connected thereto and extending in longitudinal axial alignment therewith. Anode body 30 is conventionally coated with a dielectric layer of tantalum pentoxide 32. A solid layer of manganese dioxide electrolyte 34 is provided over the dielectric layer 32 and cathode layer 36, e.g., a solderable film, e.g. silver, is provided over the electrolyte layer 34.

With reference to FIG. 2, a lead wire assembly in accordance with the present invention is shown at 100 being formed of an integral resilient wire, e.g., made of solder coated nickel copperweld wire and the like, having a pair of wires 110 and 120 which extend substantially in the same direction and lie substantially in a common plane with anode lead out rod 3 of capacitor body 1. Wires 110 and 120 are shown substantially in a common plane with anode lead out rod 3 of capacitor body 1. Wires 110 and 120 are shown substantially parallel and wire 110 has a lateral portion 130 which extends transverse to anode lead out rod 3 of capacitor body 1 of the type shown in FIG. 1. Wire 120 has an arcuate portion 125 which is spaced from lateral portion 130 and lies in a plane transverse, i.e. at a 90° angle, to the longitudinal axis of capacitor body 30 and to the common plane of wires 110, 120 and lead out rod 3.

Capacitor body 30 nests centrally in the generally conforming arcuate member 125 as shown in FIGS. 2(b) through 2(e); FIG. 2(d) shows a form of arcuate member 125 which is not a true curve shape but which, as in the embodiments of FIGS. 2(b), 2(c) and 2(e) generally conforms to the shape of the capacitor body and partially surrounds the capacitor body, e.g. ⅛ to ½ the circumference, and is within the scope of the present invention. FIG. 2(c) shows a capacitor body 1' which is smaller than that of FIG. 2(b) and FIG. 2(e) shows a capacitor body 1" which is larger than that of FIG. 2(b). FIG. 2(b), where the capacitor body 1 closely conforms to the shape of arcuate member 125 is a preferred arrangement due to maximum contact, however, all of the arrangements of FIGS. 2(b) to 2(e) provide a good contact for subsequent soldering. In the practice of the present invention and with reference to FIGS. 2(a) and 3, capacitor body 1 is fixedly positioned as are the components of lead wire assembly 100 as hereinafter described. A force F is applied to wire 110 as shown in FIGS. 2(a) and 3. This force is transverse, i.e. perpendicular, to the common plane 101 of wires 110, 120, 130 and lead out rod 3 and is sufficient to provide contact between lateral portion 130 and anode lead out rod 3. While in contact, anode lead out rod 3 is conventionally welded to lateral portion 130, force F being sufficient to ensure a good weld. A force F' is applied to wire 120 as also shown in FIGS. 2(a) and 3 and this force is also transverse, i.e. at a 90° angle, to the common plane 101 of wires 110, 120 and lead out rod 3 and this force is sufficient to provide a nesting contact between arcuate portion 125 and capacitor body 30 as shown in FIGS. 2(b) to 2(e). Due to the resilience of wire 120 and its cantilever mounting at 137, it is laterally moveable as indicated at 135, thus, enabling alignment of arcuate member 125 in a nesting contact with capacitor body 30 even if capacitor body 30 is somewhat irregular in shape or "out of line". Wire 110 is also cantilever mounted as indicated at 139 and is moveable in the direction of force F to enable close contact with anode lead out rod 3. As shown in FIG. 3 the common plane 101 of wires 110, 120, 130 and lead out rod 3 substantially contains the longitudinal axis 102 of capacitor body 1 and plane 107 substantially contains the capacitor body contacting arcuate member 125 and plane 107 is transverse to plane 101.

FIG. 4, shows an automated embodiment of the present invention. In FIG. 4, a plurality of lead wire assemblies 100 in accordance with the present invention are shown mounted on a support member 200, e.g., made of cardboard and affixed thereto by tape 210. Support member 200 is mounted on an assembly "boat" 220, e.g., made of a metal such as aluminum, by means of pins 230 and clamps 240. A slotted "comb" member 250 is affixed to boat member 220, e.g. by welding, to assist in the alignment of lead wire assemblies 100 in relation to capacitor bodies 1 which are welded at 260 to a metal process bar 263 which is fixedly clamped to boat 220 as shown at 270. The slot 252 of comb 250 is sufficiently wide to permit lateral displacement of wires 120 as indicated at 135. Due to the cantilever extension of portion 122 of wire 120 from its fixed position on member 200, portion 122 can be resiliently deformed as indicated at 135 to accommodate capacitor bodies of varying diameter and enable nesting contact with arcuate member 125. Boat 220 is moveably supported on rail 350 and moved in the direction shown by pawl 282 of weld head 280 which has a conductive plate 290 which is at a negative potential as indicated at 300 and constitutes a negative weld electrode. Circular metal plate 310 is the positive weld electrode and plate 310 is fixed to rotatable toothed gear 320 which engages rack 330 on weld head 280. Weld head 280 is moved by rod 340 and boat 220 moves along rail 350 to consecutively place each anode lead out rod 3 of a capacitor body 1 at location 360 where circular plate 310 is positioned in relation to assemblies 100 such that a force F is applied to a lateral portion 130 and establishes contact between lateral portion 130 and anode lead out rod 3. The direction of this welding force F is transverse, i.e. at an angle of 90°, to the substantially common plane of wires 110, 120, 130 and lead out rod 3 as indicated at 364. While in such contact, timer 370 permits welding current to flow from 300 and the anode lead out rod 3 and lateral portion 130 are welded. This welding and application of welding force is repeated as each capacitor reaches location 360. When all the capacitor bodies on boat 220 have been thus subjected to welding, boat 220 is advanced to a position over soldering pot 370 which is raised to immerse capacitor bodies 1 in molten solder 400. A lead frame clamp 30 simultaneously applies a soldering force F' to all wires 120 as shown in FIG. 4, which places arcuate portions 125 in nesting contact with capacitor bodies as hereinabove described. The direction of the soldering force F' is transverse to the common plane wires 110, 120, 130 and lead out rod 3. Any misalignment or irregularity in the diameters of capacitor bodies 30 is accommodated by the resiliency of cantilever mounted wire 120 as hereinabove described. Boat 220 is advanced after the welding of lateral portions 130 and the soldering of arcuate portions 125 to a position where cutter 400 cuts the anode lead out rod from process bar 263 and wires 110 and 120 are cut by cutter 410. The assembled capacitor bodies are then encapsulated by techniques known in the art, tested, and are suitable for connection in circuit boards and the like. Alternatively, wires 110 and 120 can be cut before support member 200 is mounted on boat 220. Also wires 110 and 120 can be separately formed and separately mounted rather than being initially formed as in integral wire form.

A particular advantage of the lead wire assembly of the present invention is that the spacing between the resultant anode and cathode leads does not vary excessively with substantial variation in diameter of capacitor bodies which frequently occurs due to the multiple dip coatings involved in the manufacture of capacitor bodies. This advantage is due to the fact that the arcuate portion of the the cathode lead wire can establish satisfactory contact with a capacitor body with relatively small displacement of the straight portion of the cathode lead wire.

I claim:

1. Method for providing an anode lead wire and a cathode lead wire on a solid electrolytic capacitor having a substantially cylindrical body including an anode, an anode lead in contact with and connected to the anode and extending along the longitudinal axis of said cylindrical body, a dielectric layer on the anode, a solid electrolytic cathode layer on the dielectric layer, said method comprising: providing a pair of cantilever mounted preshaped, resilient wires, each wire of said pair of wires having resiliently deformable extended portions substantially parallel to each other and substantially lying in a selected plane containing the longitudinal axis of said cylindrical capacitor body, one of said pair of wires being an anode lead wire and the resiliently deformable extended portion thereof having an end portion lying substantially in said selected plane, the other wire of said pair of wires being the cathode lead wire and the resiliently deformable extended portion thereof having an arcuate portion spaced from said end portion of said anode lead wire lying in a plane transverse to said selected plane, said arcuate portion having a shape generally conforming to the substantially cylindrical capacitor body; positioning said cylindrical capacitor body with respect to said anode lead wire such that said anode lead of said cylindrical capacitor body is closely adjacent to said end portion of said anode lead wire; positioning said cylindrical capacitor body with respect to said cathode lead wire such that said cylindrical capacitor body is closely adjacent to the generally conforming arcuate portion of said cathode lead wire; subjecting said resiliently deformable extended portion of said cathode lead wire to a force which is in a direction transverse to said selected plane, said force being sufficient to establish a nesting contact between said arcuate portion of said cathode lead wire and said cylindrical capacitor body; soldering said arcuate portion to said capacitor body while said force is applied; subjecting said anode lead wire to a force which is in a direction transverse to said selected plane, said force being sufficient to establish contact between said end portion of said anode lead wire and said anode lead of said capacitor body and welding said end portion to said anode lead while said force is applied.

* * * * *